United States Patent [19]

Litrico

[11] 4,445,295

[45] May 1, 1984

[54] MARINE LIFE TRAPS

[76] Inventor: Biagio Litrico, P.O. Box 742, Fernandina Beach, Fla. 32034

[21] Appl. No.: 441,399

[22] Filed: Nov. 15, 1982

[51] Int. Cl.³ .......................................... A01K 71/00
[52] U.S. Cl. ..................................... 43/102; 43/100; 43/105
[58] Field of Search ............... 43/100, 101, 102, 103, 43/104, 105

[56] References Cited

U.S. PATENT DOCUMENTS

| | | |
|---|---|---|
| 619,138 | 2/1899 | Chase . |
| 1,143,758 | 6/1915 | Franklin . |
| 1,447,502 | 3/1923 | Asanio et al. . |
| 1,958,724 | 5/1934 | Stanislaw . |
| 2,473,910 | 6/1949 | Ruiz . |
| 2,489,856 | 11/1949 | Buford . |
| 2,586,350 | 2/1952 | Lamb . |
| 2,639,540 | 5/1953 | Buford . |
| 2,679,125 | 5/1954 | Howard . |
| 2,716,304 | 8/1955 | Taylor . |
| 3,300,890 | 1/1967 | Thomassen . |
| 3,380,187 | 4/1968 | Werstlein . |
| 3,908,301 | 9/1975 | Ortiz . |
| 4,134,226 | 1/1979 | Petrella . |
| 4,156,984 | 6/1979 | Kinser, Sr. . |

FOREIGN PATENT DOCUMENTS 1080705 12/1954 France .
1280730 5/1962 France .

Primary Examiner—Willie G. Abercrombie
Assistant Examiner—Kurt Rowan
Attorney, Agent, or Firm—Buell, Blenko, Ziesenheim & Beck

[57] ABSTRACT

The trap top and bottom portions are reeved with an operator line such that the operator above water may by taking in line pull the top portion down onto the bottom portion and enclose the bait and attendant marine life therein preliminary to raising the closed trap out of the water. In addition, a second float is attached to the top portion. The second float has sufficient buoyancy to hold the top portion in the raised position, but insufficient buoyancy to lift the entire trap. The second float is connected to the top portion through a timed release device of pre-selected duration. The timed release may be a soluble link with a known rate of solubility in water and of a thickness selected to last in the water for the length of time desired. When float release occurs the top portion drops onto the bottom portion to enclose the bait and marine life while said second float, which is slidably attached to the operator line, rises to the surface to signal the operator that the trap is closed and ready to retrieve.

12 Claims, 4 Drawing Figures

MARINE LIFE TRAPS

This invention relates to marine life traps and particularly to a time and/or hand released trap for marine life such as crabs, shrimp, lobster and the like which may be lured by bait into a trap.

Collapsible traps for use in trapping crabs and various fish forms and other marine life which can be lured by bait are old and well known. Such devices generally involve a baited net arrangement of some sort. The most common form of crab and lobster traps are pot types with a funnel ingress and chambers. A less common form of crab trap involves a top and bottom which are separated in the baited position and are drawn closed by some pull rope arrangement by an operator after the passage of a preset time or by the operator feeling an accumulation of weight on the line. Examples of various traps are illustrated and described in U.S. Pat. Nos. 4,134,226; 2,473,910; 1,143,758; 3,300,890; 4,156,984; 619,138; 1,447,502; 1,958,724; 2,489,856; 2,586,350; 2,639,540; 2,679,125; 2,716,304; 3,380,187; and 3,908,301. All of these traps have drawbacks. Many require that an operator close them in order to be commercially effective to make a catch. Some remain open even if they break away and continue to trap marine life which is thus wasted. Most of them require excessive amounts of storage space on a boat going to and from the fishing area. The foregoing are but a few of the major problems in present day marine life traps.

The present invention solves all of the foregoing problems. It provides a trap which is collapsible and stackable and readily stored in a relatively small space. It provides an automatic closure in water at a preselected elapsed time and a manual closure at a lesser time if desired. By reason of the controlled automatic closure it cannot remain open and continue to trap marine life over a long period of time and even if somehow it stayed open it cannot trap marine life in the open position. The structure of the invention is such that access into the trap is open and unobstructed providing virtually 360° ingress horizontally and whose height or vertical dimension can be varied according to the species being sought.

I provide a trap for catching marine life species which may be baited and which generally comprises, a bottom planar member, a vertical guide means on said bottom planar member, a top closure means slidably guided on said vertical guide means from a closed position in contact with the bottom planar member to an open position spaced from and above the bottom planar member, buoyancy means connected to said enclosure means by a connector means and normally maintaining the enclosure means in open position in a water environment, a timed disengageable link means in said connector means between the buoyancy means and enclosure means releasing said buoyancy means from the enclosure means after a pre-selected immersion time, and lifting means connecting the bottom planar member and the top enclosure means whereby said enclosure means may be manually moved to the closed position and held in the closed position and the trap and contents lifted whether the timed link means has disengaged or not. Preferably the bottom planar member is provided with two vertical guide members on diametrically opposite sides of the bottom planar member. Preferably the enclosure means is a generally conical or pyramidal netting fixed to a bottom frame and a top guide member.

The enclosure means is maintained in the pyramidal or conical shape by buoyant means or a rigid frame means as desired. The lift means is preferably a rope or line attached at one end to the enclosure member and reeved around a reeving means attached to the bottom planar member.

In the foregoing general description of my invention, I have set out certain objects, advantages and purposes of my invention. Other objects, purposes, and advantages of this invention will be apparent from a consideration of the following description and the accompanying drawings in which.

Figure 1:
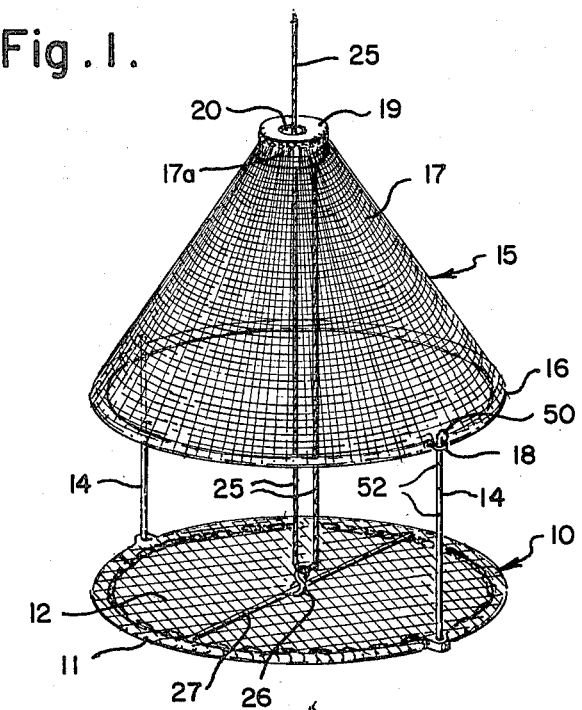
FIG. 1 is an isometric view of a first embodiment of marine trap according to this invention.
Figure 2:
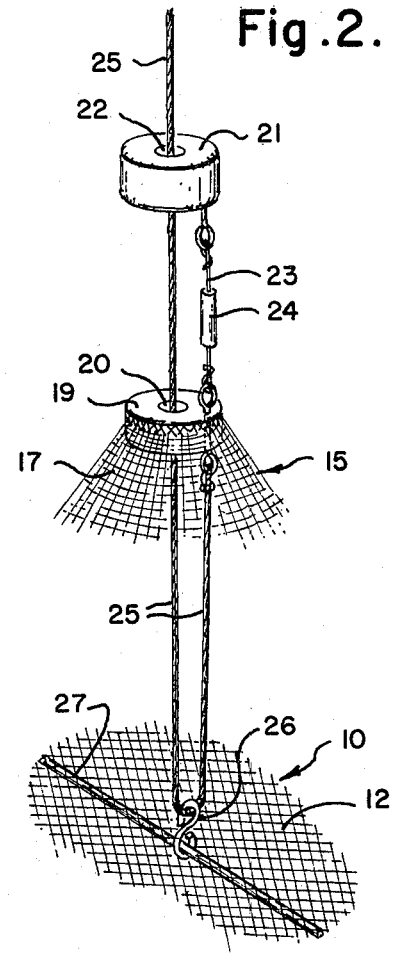
FIG. 2 is a schematic illustration of the lift rope reeving of the structure of FIG. 1.

Referring to the drawings, I have illustrated in FIG. 1, a marine trap having a planar bottom member 10 made up of a circular frame 11 of metal rod to which is attached a perforate bottom sheet 12 made of hardware cloth or netting upon which suitable bait is centrally disposed. A pair of vertical guide members 14 are attached to the frame 11 on diametrically opposite sides. An enclosure means 15 made up of a circular bottom frame 16 of metal or suitably weighted material sufficient to drop quickly when triggered or pulled to which is attached a generally frusto conical net 17 is slidably mounted by guide rings 18 on the vertical guide members 14. A float 19 having a central opening 20 is fixed to the apex 17a of conical net 17 and buoys up the net when submerged to hold it in its conical shape, and when unsubmerged permits it to collapse for most efficient storage. Referring to FIG. 2, a second float 21 having a central opening 22 is connected to float 19 by a connecting line 23 having a disengageable link 24 intermediate its length. Preferably, disengageable link 24 is made of a soluble material which has a pre-selected solubility rate which will cause connector 23 to separate at a pre-determined water immersion time and permit top enclosure 15 to sink onto bottom planar member 10 to automatically close the trap. Float collar 19 is selected to have sufficient buoyancy to hold net 17 in its expanded condition but not buoyant enough to hold enclosure 15 suspended above bottom member 10. Float 21 is designed to add the necessary extra buoyancy to hold net 17 above bottom member 10 until link 24 separates. A pull rope 25 is attached at one end to float 19 and passes through a ring or sheave 26 fixed to planar bottom member 10 as by rod 27 attached to frame 11. From sheave 26, rope 25 passes through opening 20 in float 19 and opening 22 in float 21 and from thence either to the operator's boat or to a surface float or dock. Rope 25 is thus used to lower the trap into place and to lift the trap after it has automatically closed when link 24 dissolves. Optionally, the trap may be manually closed and lifted at any time the operator desires before link 24 dissolves or in its absence, by simply pulling up the line from the water surface end.

The physics involved in the embodiment of FIG. 1 may be expressed mathematically as follows:

Where:

$F_1$ is the buoyancy force of float 19, $F_2$ is the buoyancy force of float 21, $W_1$ is the weight of top enclosure means 15 and
$W_2$ is the weight of bottom member 10 and guide members 14.
Then:

$F_1 < W_1$ $F_1 + F_2 > W_1 < (W_1 + W_2)$

Figure 4:
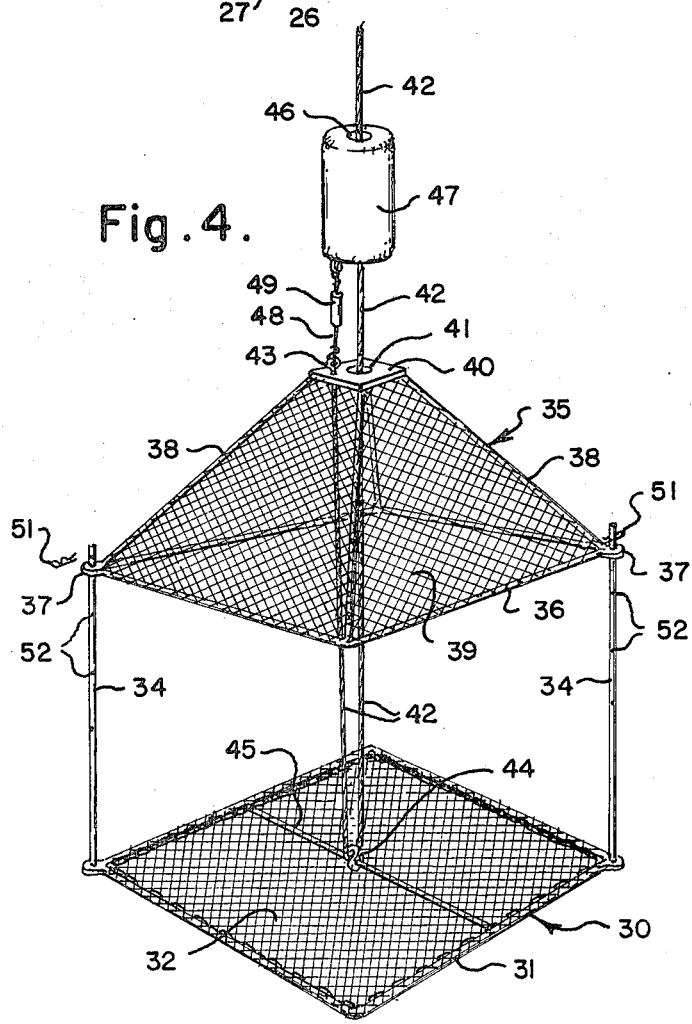
FIG. 4 is an isometric view of a second embodiment of marine trap according to this invention.

In the embodiment illustrated in FIG. 4 I have shown a bottom planar member 30 made up of a rectangular metal frame 31 and a bottom sheet 32 of hardware cloth or netting attached thereto around the frame and upon which suitable bait is centrally disposed. Vertical guide rods 34 are attached to frame 31 at opposite corners. An enclosure means 35 of pyramidal shape has a bottom frame 36 with guide rings or openings 37 slidable on guide rods 34 and vertically inwardly extending corner members 38 to which netting 39 is attached. A top plate 40 connects the top ends of corner members 38 and is provided with an opening 41 through which a lift rope or line 42 passes. One end of lift rope 42 is attached to top plate 40 and then passes downwardly around ring or sheave 44 fixed to bottom sheet 32 by rod 45 attached to frame 31, and thence upwardly through opening 41 and through opening 46 in a float 47 and then to a surface float on the tender boat or dock. Float 47 is attached to top member 40 as at ring 43 by a connector 48 having a soluble link 49 intermediate its ends which functions as a timed release means precisely as link 24 of FIG. 2. Float 47 is sufficiently buoyant to hold the entire enclosure member 35 spaced above the bottom member 30. Similar to the embodiment of FIG. 1, rope 42 is used to lower the trap assembly into place and to lift the same with the catch after link 49 has dissolved and dropped enclosure member 35 over the catch on bottom member 30. Rope 42 may, as in the embodiment of FIG. 1, be used optionally to manually pull enclosure member 35 down onto bottom member 30 to enclose the catch and then lift the trap.

Figure 3:
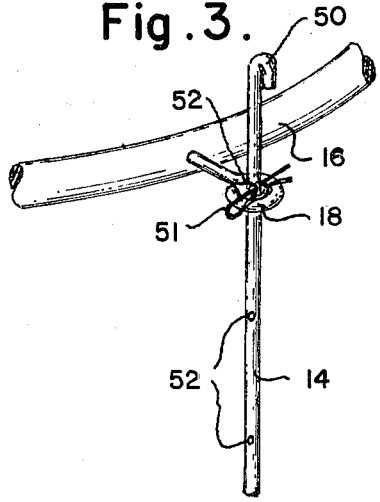
FIG. 3 is a fragmentary view of a guide ring with vertical guide member and stops on the enclosure member of FIG. 1.

In operation both embodiments of the invention are lowered to the sea bottom by lift rope 25 in the embodiment of FIGS. 1 and 2 and lift rope 42 in the embodiment of FIG. 4. Once the trap is set down on the sea bottom, the lift rope is slackened at least sufficiently to permit floats 19 and 21 in the embodiment of FIGS. 1 and 2 or float 47 in the embodiment of FIG. 4 to raise the respective enclosure means 15 and 35 to the open position against stops 50 or retainers 51 disposed in openings 52 in guide rods 14 and 34 respectively. The retaining members 51 may be inserted into a choice of matched openings 52 provided in rods 14 and 34 to select a desired vertical height for the trap opening, see FIG. 3. After a predetermined time, links 24 and 49 dissolve causing the float to release and thereby drop the enclosing means onto the bottom members and trapping the catch therein. The trap and contents are then raised by the lift ropes. Alternatively, as described earlier, the traps may be manually closed and lifted.

In the foregoing specification I have set out certain preferred practices and embodiments of this invention, however, it will be understood that this invention may be otherwise embodied within the scope of the following claims. Applicant requests that all correspondence regarding this matter be addressed to Frederick B. Ziesenheim.

I claim:

1. A trap for catching marine life species which may be baited comprising a bottom planar member, vertical guide means attached to said bottom planar member, a top enclosure means slidably guided on said vertical guide means between a closed position in contact with the bottom planar member to an open position spaced from and above the bottom planar member, stop means limiting the open position of the enclosure means, buoyancy means spaced from the enclosure means, connecting means between the buoyancy means and enclosure means whereby the buoyancy means normally maintains the enclosure means in the open position in a water environment, a timed disengageable link means intermediate the ends of said connector means releasing at least a part of said buoyancy means from the enclosure means whereby the enclosure means is free to fall downwardly onto the bottom planar member after a pre-selected time of immersion and lifting means connecting the bottom planar member and the enclosure means whereby the enclosure means may be moved to the closed position and held in the closed position and the trap and contents lifted whether the timed link has disengaged or not.

2. A trap as claimed in claim 1 wherein the bottom planar member is a round metal frame carrying a perforate metal sheet and having a pair of diametrically opposed guide rods and the enclosure member is a generally conical net.

3. A trap as claimed in claim 1 wherein the bottom planar member is a square metal frame carrying a perforate metal sheet and having a pair of guide rods at opposite corners and the enclosure means is a generally pyramidal net.

4. A trap as claimed in claim 1 or 2 or 3 wherein the enclosure means is maintained in its shape by buoyant means.

5. A trap as claimed in claim 1 or 2 or 3 wherein the enclosure means is maintained in its shape by a rigid frame means.

6. A trap as claimed in claim 4 wherein the buoyant means is a pair of separate floats, one fixed to the enclosure means and having sufficient buoyance to maintain the enclosure means in its full shape but not to hold it spaced from the bottom planar member and the other spaced from the first and connected thereto by said disengageable link, the buoyancy of the combined floats being sufficient to maintain the enclosure member in the open position.

7. A trap as claimed in claim 1 or 2 or 3 wherein the lift means is a rope fixed at one end to the enclosure means and reeved around a reeving means generally centrally of the bottom planar member and back upwardly through an opening in the enclosure means.

8. A trap as claimed in claim 4 wherein the lift means is a rope fixed at one end to the enclosure means and reeved around a reeving means generally centrally of the bottom planar member and back upwardly through an opening in the enclosure means.

9. A trap as claimed in claim 5 wherein the lift means is a rope fixed at one end to the enclosure means and reeved around a reeving means generally centrally of the bottom planar member and back upwardly through an opening in the enclosure means.

10. A trap as claimed in claim 6 wherein the lift means is a rope fixed at one end to the enclosure means and reeved around a reeving means generally centrally of the bottom planar member and back upwardly through an opening in the enclosure means.

11. A trap as claimed in claim 1 wherein the timed disengageable link is composed of a material soluble in water that dissolves at a pre-selected rate of time.

12. A trap as claimed in claim 1 wherein said stop means is adjustable to selectively control the vertical height of the trap opening in said open position.

* * * * *